United States Patent
Mack

(10) Patent No.: US 7,850,404 B2
(45) Date of Patent: Dec. 14, 2010

(54) DRILL CHUCK

(75) Inventor: Hans-Dieter Mack, Sontheim (DE)

(73) Assignee: Rohm GmbH, Sontheim (DE)

( * ) Notice: Subject to any disclaimer, the term of this patent is extended or adjusted under 35 U.S.C. 154(b) by 949 days.

(21) Appl. No.: 11/702,020

(22) Filed: Feb. 2, 2007

(65) Prior Publication Data

US 2007/0182108 A1    Aug. 9, 2007

(30) Foreign Application Priority Data

Feb. 6, 2006    (DE) ...................... 10 2006 005 241

(51) Int. Cl.
*B23B 31/16*    (2006.01)
(52) U.S. Cl. .................... 408/140; 279/60; 279/902
(58) Field of Classification Search ............... 408/140; 279/60–65, 140, 902; *B23B 31/16*
See application file for complete search history.

(56) References Cited

U.S. PATENT DOCUMENTS

| | | | | |
|---|---|---|---|---|
| 4,302,021 A | * | 11/1981 | Rohm | 279/60 |
| 5,009,439 A | * | 4/1991 | Sakamaki | 279/62 |
| 5,183,274 A | * | 2/1993 | Sakamaki | 279/62 |
| 5,261,679 A | * | 11/1993 | Nakamura | 279/62 |
| 5,337,634 A | * | 8/1994 | Carnesi | 81/128 |
| 5,499,829 A | * | 3/1996 | Rohm | 279/62 |
| 6,073,939 A | * | 6/2000 | Steadings et al. | 279/62 |
| 6,302,407 B1 | * | 10/2001 | Hsueh | 279/62 |
| 6,834,864 B2 | * | 12/2004 | Girardeau | 279/60 |
| 7,325,812 B2 | * | 2/2008 | Long et al. | 279/62 |
| 7,360,770 B2 | * | 4/2008 | Luckenbaugh et al. | 279/62 |
| 2006/0208435 A1 | * | 9/2006 | Rohm | 279/140 |
| 2008/0042375 A1 | * | 2/2008 | Yaksich | 279/62 |
| 2009/0200758 A1 | * | 8/2009 | Lam et al. | 279/62 |
| 2009/0224491 A1 | * | 9/2009 | Thiel | 279/62 |
| 2010/0181735 A1 | * | 7/2010 | Zhou et al. | 279/62 |
| 2010/0207336 A1 | * | 8/2010 | Mack | 279/60 |

* cited by examiner

*Primary Examiner*—Eric A Gates
(74) *Attorney, Agent, or Firm*—Andrew Wilford

(57) ABSTRACT

A drill chuck has a rotatable chuck body, a tightening sleeve axially fixed but rotatable on the chuck body, a plurality of jaws on the body and radially displaceable between inner and outer end positions, and a screwthread formation for radially displacing the jaws between their end positions on relative rotation of the body and sleeve. An inner element rotationally fixed on the chuck body has an elliptical outer surface generally centered on the axis and bearing on a flexible coupling ring having an annular array or radially outwardly projecting coupling teeth. First and second rings each have an annular array of radially inwardly projecting teeth meshing with the coupling teeth. The first ring is fixed and second ring is rotatable relative to the chuck body adjacent the first ring. The second-ring array of teeth has a number of teeth different from that of the first-ring array of teeth.

12 Claims, 5 Drawing Sheets

DRILL CHUCK

FIELD OF THE INVENTION

The present invention relates to a drill chuck. More particularly this invention concerns for a power drill.

BACKGROUND OF THE INVENTION

A standard drill chuck as described in U.S. Pat. No. 5,765,839 has a chuck body rotatable about a chuck axis and provided centered on the axis with an annular array of teeth each having a steep flank and a shallow flank. Jaws angularly spaced on the body about the axis are radially displaceable relative to the body between inner and outer positions. A tightening ring is axially fixed but rotatable about the axis on the body in a tightening direction and in an opposite loosening direction. A pair of screwthread formations between the tightening ring and the jaws move the jaws radially together on rotation of the tightening ring in the tightening direction and radially apart on rotation of the tightening ring in the loosening direction. A locking member engageable with the teeth and angularly fixed on the tightening ring is radially displaceable between a locking position engaging the teeth and preventing rotation of the body relative to the tightening ring in the loosening direction and a freeing position permitting free rotation of the body relative to the tightening ring in both directions. A setting ring axially fixed but angularly displaceable on the tightening ring is formed with a pair of angularly spaced and radially open seats. A pair of angularly spaced abutments between the setting ring and the tightening ring limit angular movement of the sleeve on the ring to movement between a pair of end positions of the sleeve on the ring. A cam on the setting ring is engageable with the locking member for displacing the locking member into the locking position when the setting ring is in one of its end positions and for displacing the locking member into the freeing position when the setting ring is in the other of its end positions. A latch member angularly fixed on the tightening ring is engageable in the seats of the setting ring for releasably retaining the setting ring in its end positions. A common spring extending angularly along and fixed angularly in the tightening ring urges the latch member into the seats and the locking member into the freeing position.

Such a chuck is normally mounted on a spindle of a power unit and is operated in so-called power-open or power-close mode by gripping and manually arresting the tightening ring while operating the power unit to rotate the spindle in forward or reverse to shift the jaws appropriately. This procedure has the disadvantage that the considerable torque of the spindle, which is rotating at a good speed, is applied to the jaws at the ends of their travel, often jamming them in place or at best subjecting the various parts to considerable stress.

OBJECTS OF THE INVENTION

It is therefore an object of the present invention to provide an improved drill chuck.

Another object is the provision of such an improved drill chuck that overcomes the above-given disadvantages, in particular that is which allows the chuck, even when being power opened or closed, especially the latter, to be operated more gently.

SUMMARY OF THE INVENTION

A drill chuck has according to the invention a chuck body rotatable about a chuck axis, a tightening sleeve axially fixed but rotatable about the axis on the chuck body, a plurality of jaws angularly spaced on the body about the axis and radially displaceable between inner and outer end positions, a screwthread formation for radially displacing the jaws between their end positions on relative rotation of the body and sleeve, an inner element rotationally fixed on the chuck body and having an elliptical outer surface generally centered on the axis, a flexible coupling ring engaged over the inner-element outer surface and having an annular array or radially outwardly projecting coupling teeth, a first ring fixed to the chuck body and having an annular array of radially inwardly projecting teeth meshing with the coupling teeth, a second ring rotatable about the axis relative to the chuck body adjacent the first ring and having an annular array of radially inwardly projecting teeth also meshing with the coupling teeth. The second-ring array of teeth having a number of teeth different from that of the first-ring array of teeth so that the elliptical outer surface engages the coupling teeth at diametrally opposite locations with the first- and second-ring teeth and relative rotation of the chuck body and the adjustment sleeve angularly shifts the first and second rings relative to each other, and indicia on the rings indicating relative angular offset.

With this chuck a relative rotation of the chuck body and to the tightening sleeve occurs when the tightening sleeve is gripped and arrested and the drilling spindle is rotated in the conventional manner, which rotation serves to open or close the chuck. In addition, however, during the rotation of the chuck body, due to the different number of teeth of the rear outer ring relative to the front outer ring, there is also rotation of the rear outer ring relative to the first ring as a function of the difference in the number of teeth and the rotation of the chuck body. As a result, the rotational position of the rear outer ring can be correlated precisely with the position of the jaws, so that a position indicator for the jaws is created and the user can select a suitable opening prior to tensioning the drill. This prevents that during the tensioning operation the jaws have to be adjusted with great momentum across a large adjustment range.

According to the invention, it is preferred if the indicia is formed by a scale, since this way separate marks exist for the most common diameters. Furthermore, it has proven advantageous if the front outer ring and the rear outer-ring are mounted axially adjacent each other and the front outer ring has a position indicator or pointer. The front outer ring, representing a reference and/or comparative position, therefore can provide indicate position on the rear outer ring, which indication, for example, is a concrete opening diameter of the jaws that is associated with the scale.

According to a preferred embodiment, the jaws are guided in a longitudinally displaceable manner in guides provided at an angle to the chuck axis on the chuck body and engage with a radially outside row of teeth with an internal thread formed on the adjustment sleeve. Chucks with round jaws are presently standard in the do-it-yourself market, which standard can also be further developed through the invention. It is common for the tightening sleeve to be formed by a threaded ring and a tension sleeve, thus offering the possibility of either coupling the front outer ring to the threaded ring or the tension sleeve.

Alternatively, it is also possible for the tightening sleeve to be formed by a jaw holder and a clamping cone that form internal guides holding the jaws that are also guided radially in grooves of a pusher engaging with a threaded stem in an internal thread of the chuck body, which thread is coaxial to the chuck axis. Chucks of this type are known as so-called self-tightening chucks, the jaws being configured as flat jaws movable in the guides of a clamping cones to vary the jaw opening. In this embodiment, it is particularly useful to couple the front outer ring to the jaw holder.

According to a further embodiment of the invention, the tightening sleeve comprises means for rotationally coupling to the housing of the drill. This includes a slip clutch for releasing when a predefined torque value is exceeded. This embodiment takes advantage of the fact that the drive of the drill can be used to adjust the chuck, the tightening sleeve being fixed relative to the chuck driven by the drilling spindle relative to the housing. Since the user no longer has to hold the tightening sleeve, it is possible to provide the means with a shield sleeve surrounding the tightening sleeve. This shield sleeve is transparent at the first and rear outer rings. As a result, the shield sleeve contains the chuck, eliminating rotating components for the user, as a result of which the indicia and/or the position indicator remain visible without change because the shield sleeve is configured to be transparent in the relevant region.

Furthermore, it is also possible that the rear outer ring may be enclosed by an axially adjustable indicator ring that has a radial cam formed as a helicoid or partial screw thread with which cam a member of the rear outer ring engages. In this embodiment, the clamped position of the jaws is not indicated by means of the indicia migrating in the circumferential direction, but instead by the axial adjustment of the indicator ring, which can therefore always be controlled from the same direction, allowing the user to find the indicia in the conventional manner without searching.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
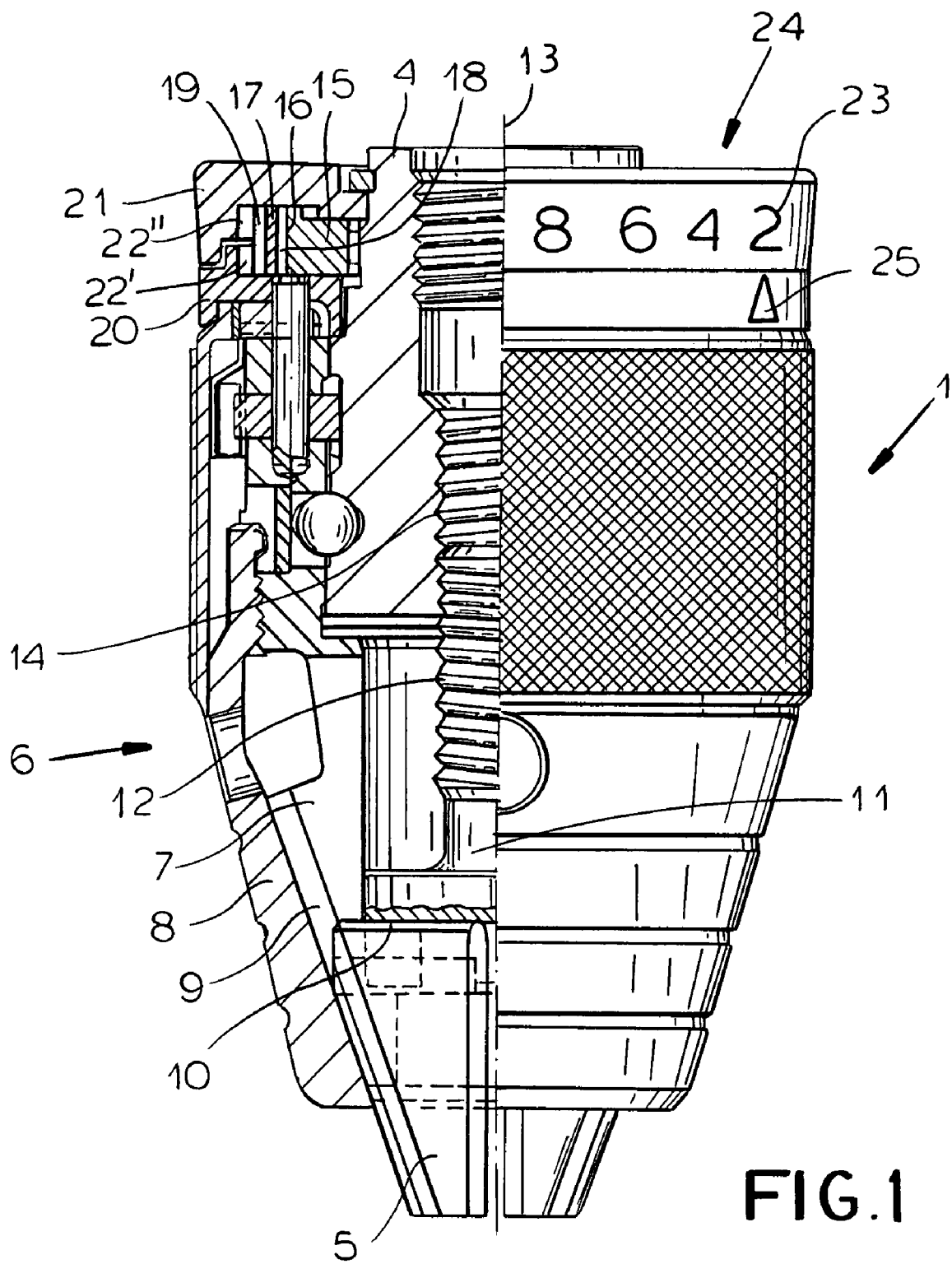
FIG. 1 is a chuck according to a first embodiment, on the left in axial section, on the right in side view.

As seen in FIG. 1, a drill chuck 1 is centered on and rotatable about an axis 13 by a drive spindle 2 of a drill power unit 3, to which end the spindle 3 is threaded into an axially centered bore of a chuck body 4. A tightening sleeve or ring 6 also centered on the axis 13 and axially fixed but rotatable about the axis 13 on the body 4 is formed of a front part 8 and a jaw holder 7 together forming three angularly equispaced guides 9. Respective jaws 5 in the guides 9 have rear ends engaged in axially forwardly open seats 10 of a pusher 11 having a threaded stem 12 engaged into a front portion of the bore 14 extending axially through of the chuck body 4. The guides 9 are angled such that relative rotation of the body 4 and sleeve 6 in one direction moves the jaws 5 axially forward (down in FIG. 1) and radially inward by axially advancing the pusher 11, and opposite rotation moves them axially rearward and radially outward by retracting the pusher 11. Such relative rotation is effected typically by appropriate actuation of the electric motor driving the spindle 2 while the user grips and rotationally arrests the sleeve 6. This is all generally standard.

According to the invention a rigid elliptical inner disk or ring 15 is rotationally fixed on the chuck body 4 and has an elliptical outer surface 16. A flexible intermediate coupling ring 17 has a smooth inner surface 18 sliding on the inner-ring outer surface 16 and an outer surface formed with an array of radially outwardly projecting and axially extending teeth 19. A front cylindrical outer ring 20 and a rear cylindrical outer ring 21 have respective rows of internal teeth 22' and 22" meshing with the teeth 19.

The front outer ring 20 is rotationally fixed to the tightening sleeve 6, but the rear ring 21 can rotate on the chuck 1 about the axis 13. The number of teeth 22' of the front outer ring 20 corresponds substantially to the number of teeth 19 of the intermediate coupling ring 17, while the number of teeth 22" of the rear outer ring 21 differs from the number of teeth 22' of the front outer ring 20. The ring 15 deforms the intermediate ring 17 to engage with both the front and rear outer rings 20 and 21 in diametrically opposite regions aligned on its major axis.

On rotation of the elliptic inner ring 15, the major ellipse axis pivots along with the tooth engagement region, as do the regions where its teeth 19 mesh with the teeth 22' and 22". If, for example, the front outer ring 20 has two fewer teeth than the rear outer ring 21, there will be relative angular movement between the front outer ring 20 and the rear outer ring 21 by one tooth for each 180° of rotation of the elliptic inner ring 15. The extent angular movement of the rotatable rear outer ring 21 relative to the front ring 20 fixed on the sleeve 6 therefore proportional to the rotation of the chuck body 4 relative to the tightening sleeve 6, so that the rotational position of the rear outer ring 21 correlates with the positions of the jaws 5.

The rear outer ring 21 carries indicia 13 that can be used to indicate the position of the jaws 5. FIG. 1 shows an embodiment in which the indicia 23 is formed by a scale 24, allowing the user to read the opening width of the jaws 5 directly from the position of the rear outer ring 21. It is advantageous in this case, which is likewise shown according to FIG. 1, if in addition to the axially adjoining configuration of the second outer ring 21 and the first outer ring 20 also a position indicator 25 is provided, which displays the opening width directly on the scale 24.

It is also possible for the chuck chucks 1 that have jaws 5 received in guides provided at an incline to the chuck axis 13 on the chuck body 4. In this case the jaws engage with radially outer rows of teeth with an internal thread formed on the tightening sleeve 6. In this embodiment, the tightening sleeve 6 is formed by a threaded ring and a clamping sleeve.

Figure 2:
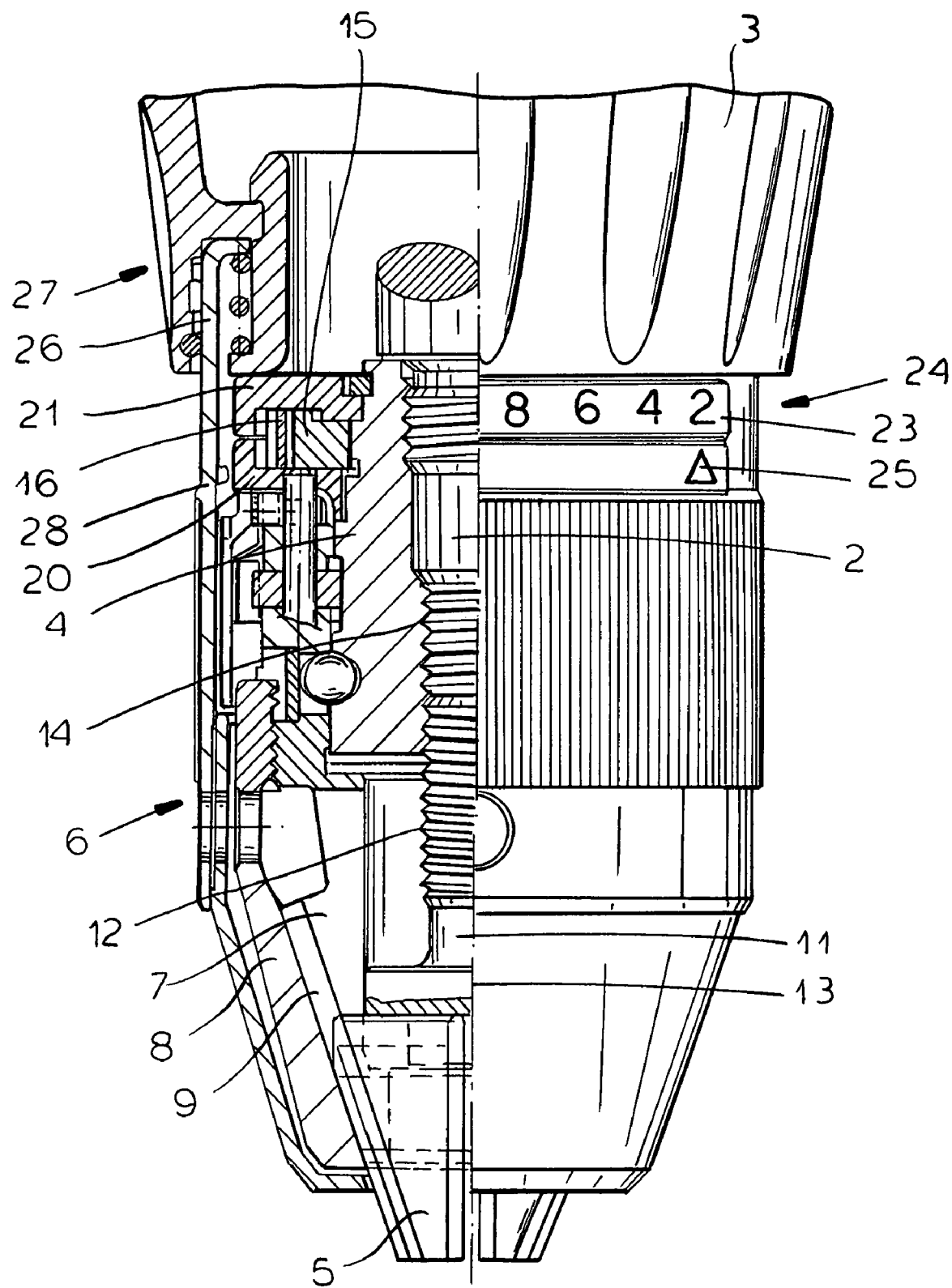
FIG. 2 is a similar view a second embodiment of the invention in conjunction with the means for nonrotatably coupling the tightening sleeve to the housing of the drill.

FIG. 2 shows an embodiment in which the tightening sleeve 6 comprises a clutch 26 for rotationally coupling to the housing of the drill 3, comprising a slip clutch 27 that releases when a predefined torque is exceeded. FIG. 2 illustrates the position with this clutch disengaged. Furthermore, it can be seen that a shield sleeve 28 is provided that surrounds the tightening sleeve 6 as well as its front part 8 and that is transparent in the regions of the first and second outer rings 20 and 21, allowing the user to see the indicia 23 from the outside.

Figure 3:
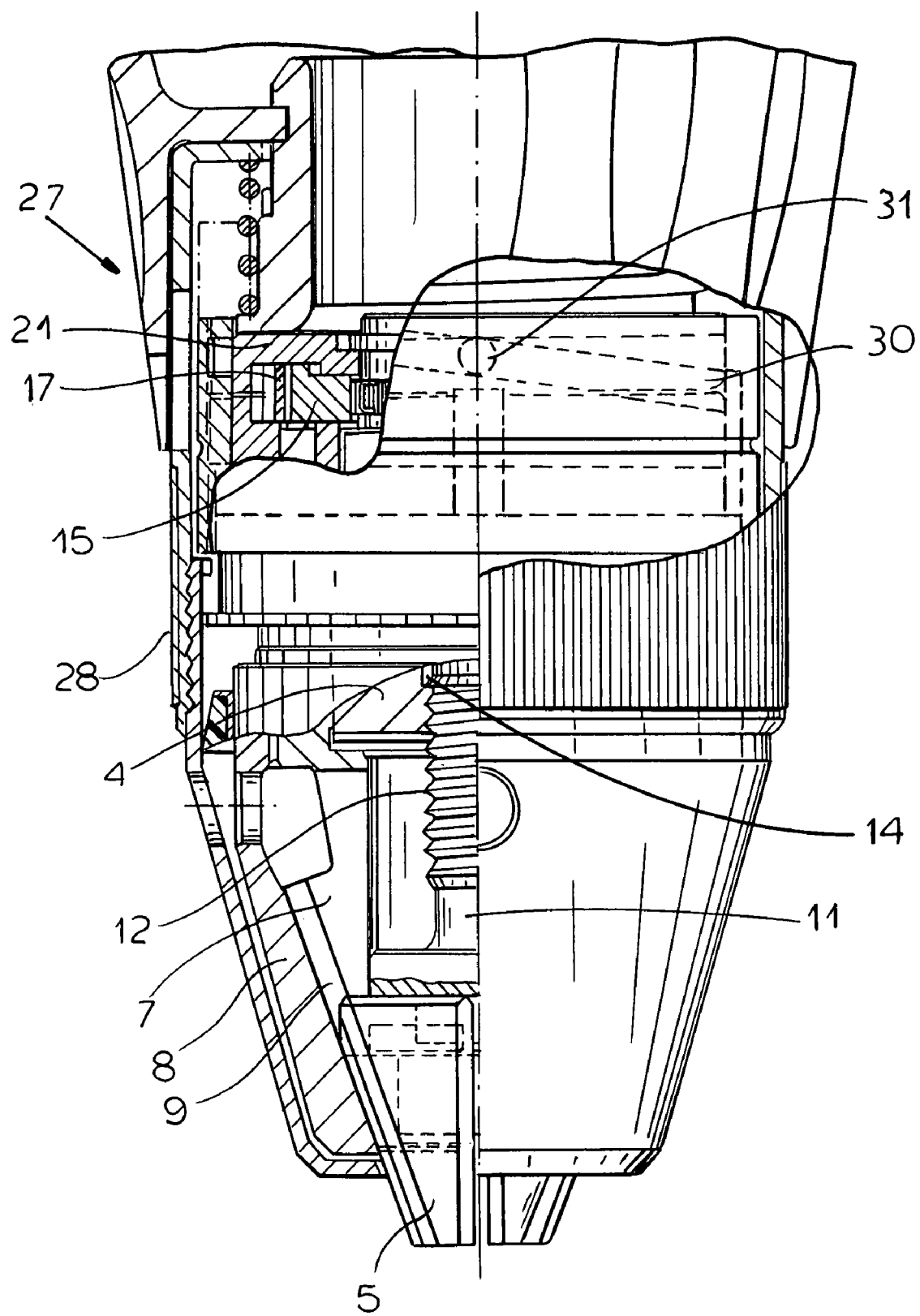
FIG. 3 is a third in a view like FIG. 2.
Figure 4:
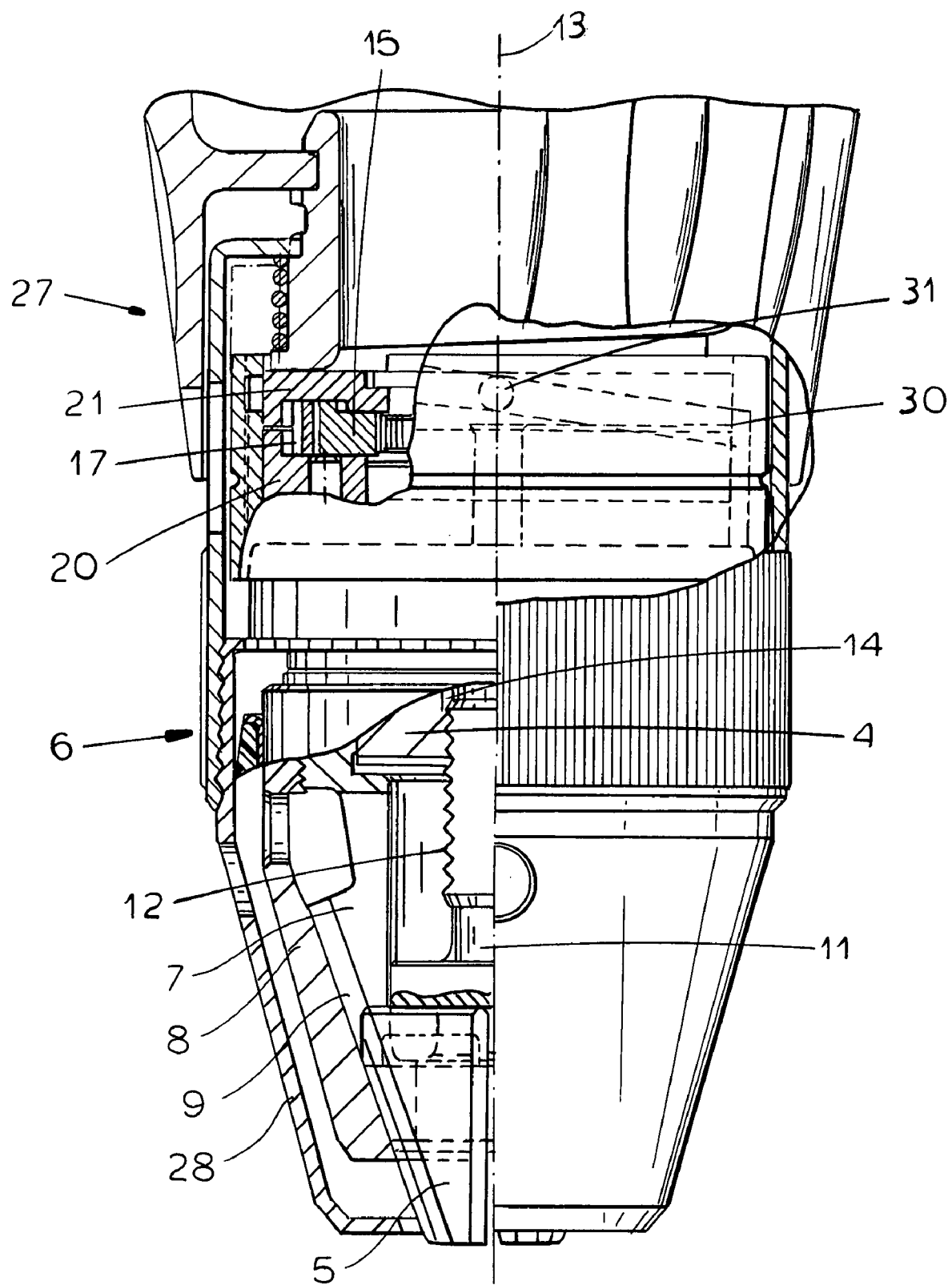
FIG. 4 is the chuck of FIG. 3 with the tightening sleeve rotationally coupled to the housing of the drill.
Figure 5:
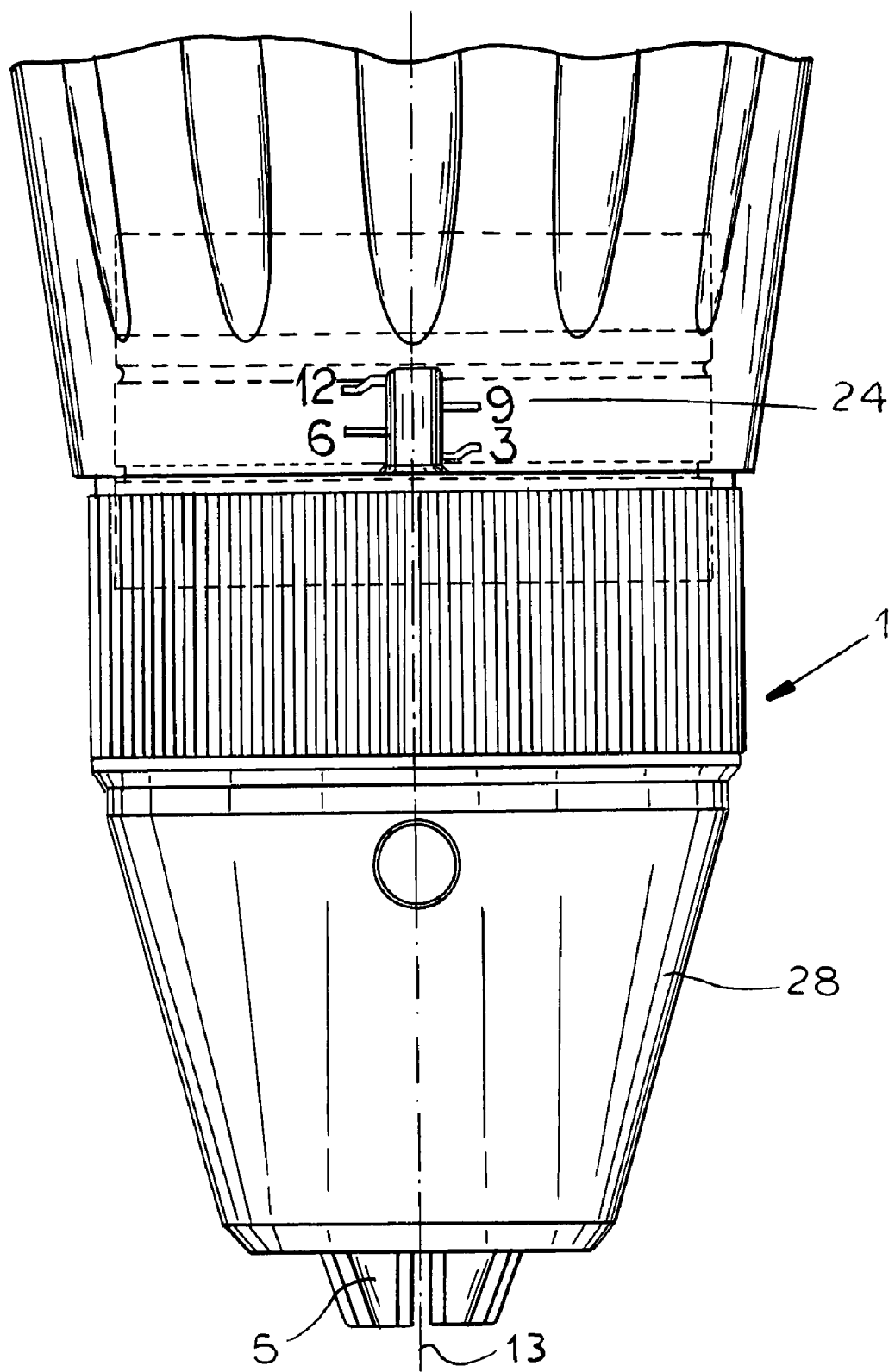
FIG. 5 is a side view of the chuck according to FIGS. 3 and 4.

This configuration is also implemented in the embodiment of FIGS. 3 to 5, where the second outer ring 21 is enclosed by an axially adjustable indicator ring 29 that has a radial cam 30 formed as a helicoid or partial screwthread engaging a follower or control member 31 of the second outer ring 21. Rotation of the second outer ring 21 axially shifts the indicator ring 29 so that its axial position shows the extent of opening width of the jaws 5. FIG. 3 shows an embodiment in which the coupling between the housing of the drill 3 and the tightening sleeve 6 has been disengaged, meaning the tightening sleeve 6 can rotate with the chuck body 4. FIG. 4 illustrates the engaged coupling, so that in this position rotation of the chuck body 4 relative to the tightening sleeve 6 is possible and thus the clamping jaws 5 are opened or closed as a function of the direction of rotation of the spindle 2.

I claim:

1. A drill chuck comprising: a chuck body rotatable about a chuck axis; a tightening sleeve axially fixed but rotatable about the axis on the chuck body; a plurality of jaws angularly spaced on the body about the axis and radially displaceable between inner and outer end positions; means including a screwthread formation for radially displacing the jaws between their end positions on relative rotation of the body and sleeve; an inner element rotationally fixed on the chuck body and having an elliptical outer surface generally centered on the axis; a flexible coupling ring engaged over the inner-element outer surface and having an annular array or radially outwardly projecting coupling teeth; a first ring fixed to the chuck body and having an annular array of radially inwardly projecting teeth meshing with the coupling teeth; a second ring rotatable about the axis relative to the chuck body adjacent the first ring and having an annular array of radially inwardly projecting teeth also meshing with the coupling teeth, the second-ring array of teeth having a number of teeth different from that of the first-ring array of teeth, whereby the elliptical outer surface engages the coupling teeth at diametrally opposite locations with the first- and second-ring teeth and relative rotation of the chuck body and the tightening sleeve angularly shifts the first and second rings relative to each other; and indicia on the rings indicating relative angular offset.

2. The drill chuck defined in claim 1 wherein the indicia includes a scale on one of the rings.

3. The drill chuck defined in claim 2 wherein the indicia includes a pointer on the other of the rings.

4. The drill chuck defined in claim 2 wherein the first and second rings are closely axially juxtaposed.

5. The drill chuck defined in claim 1 wherein the chuck body is provided with guides holding the jaws, the formation including toothed outer edges on the jaws and an internal screwthread on the tightening sleeve meshing with the toothed jaw edges.

6. The drill chuck defined in claim 5 wherein the tightening sleeve includes a rear ring having the internal screwthread and a front frustoconical ring on which the jaws ride.

7. The drill chuck defined in claim 1 wherein the tightening sleeve is formed with radially and axially extending guides holding the jaws, the means including a pusher threaded axially into the chuck body, rotationally coupled to the jaws, and bearing axially on the jaws.

8. The drill chuck defined in claim 1, further comprising
a drill housing from which projects a spindle fitted axially into the chuck body; and
clutch means for releasably securing the adjustment sleeve to the drill housing.

9. The drill chuck defined in claim 8 wherein the clutch means is a slip clutch that releases when a predetermined relative torque is applied to it.

10. The drill chuck defined in claim 8 wherein the clutch means includes a shield sleeve axially shiftable on the chuck body, surrounding the rings, and provided with a window through which the indicia is visible.

11. The drill chuck defined in claim 10 wherein the window is a transparent part of the shield sleeve.

12. The drill chuck defined in claim 1 wherein the second ring is axially shiftable relative to the first ring, the chuck further comprising:
a helicoidal formation on the second ring and
a coupling member on the first ring engaged in the helicoidal formation for axially shifting the second ring on relative angular rotation of the first and second rings.

* * * * *